United States Patent
Stötter et al.

(10) Patent No.: US 11,551,500 B2
(45) Date of Patent: Jan. 10, 2023

(54) CONTAINER, METHOD, AND SYSTEM FOR ENABLING OFFLINE ACCESS CONTROL AND FOR ENABLING OFFLINE SENSOR DATA TRANSMISSION

(71) Applicant: SMART ACCESS SOLUTIONS GMBH, Munich (DE)

(72) Inventors: Tobias Stötter, Munich (DE); Anton Epple, Munich (DE); Martin Schmidt, Poing (DE)

(73) Assignee: Smart Access Solutions GmbH, Munich (DE)

( * ) Notice: Subject to any disclaimer, the term of this patent is extended or adjusted under 35 U.S.C. 154(b) by 0 days.

(21) Appl. No.: 17/425,487

(22) PCT Filed: Jan. 13, 2020

(86) PCT No.: PCT/EP2020/050723
§ 371 (c)(1),
(2) Date: Jul. 23, 2021

(87) PCT Pub. No.: WO2020/151987
PCT Pub. Date: Jul. 30, 2020

(65) Prior Publication Data
US 2022/0084341 A1  Mar. 17, 2022

(30) Foreign Application Priority Data
Jan. 25, 2019 (DE) .................... 10 2019 000 559.7

(51) Int. Cl.
*G07C 9/22* (2020.01)
*H04W 4/80* (2018.01)
(Continued)

(52) U.S. Cl.
CPC ........... *G07C 9/22* (2020.01); *G07C 9/00309* (2013.01); *G07C 9/00896* (2013.01);
(Continued)

(58) Field of Classification Search
CPC ........ G07C 9/22; G07C 9/27; G07C 9/00309; G07C 9/00896; G07C 9/00944; H04W 4/80
See application file for complete search history.

(56) References Cited

U.S. PATENT DOCUMENTS 10,264,433 B2 * 4/2019 Ahearn ............... G07C 9/00174
2005/0232747 A1  10/2005 Brackmann et al.
(Continued)

FOREIGN PATENT DOCUMENTS

| | | |
|---|---|---|
| DE | 102011081207 A1 | 2/2013 |
| DE | 102015120296 A1 | 5/2017 |
| EP | 3412148 A1 | 12/2018 |

OTHER PUBLICATIONS

English Translation of International Preliminary Report on Patentability for parent International application No. PCT/EP2020/050723.
(Continued)

*Primary Examiner* — Nabil H Syed
(74) *Attorney, Agent, or Firm* — J-Tek Law PLLC; Jeffrey D. Tekanic; Scott T. Wakeman

(57) ABSTRACT

In a method and system for opening a container having a lock device, a mobile terminal exchanges data with the lock device using near-field data transmission and exchanges data with a server using far-filed data transmission. The mobile terminal stores container reconfiguration data and container operating data, which include at least time data and access data. The server generates new container reconfiguration data in response to receiving the container operating data from the mobile terminal and transmits the new container reconfiguration data to the mobile terminal using the far-field data transmission. The new container reconfiguration
(Continued)

data are then transmitted from the mobile terminal to the lock device using the near-filed transmission.

5 Claims, 11 Drawing Sheets

(51) Int. Cl.
*G07C 9/27* (2020.01)
*G07C 9/00* (2020.01)

(52) U.S. Cl.
CPC .......... *G07C 9/00944* (2013.01); *G07C 9/27* (2020.01); *H04W 4/80* (2018.02); *G07C 2009/00349* (2013.01); *G07C 2009/00634* (2013.01); *G07C 2009/00793* (2013.01); *G07C 2209/08* (2013.01); *G07C 2209/62* (2013.01)

(56) References Cited

U.S. PATENT DOCUMENTS

| | | |
|---|---|---|
| 2011/0005282 A1 | 1/2011 | Powers et al. |
| 2014/0051407 A1 | 2/2014 | Ahearn et al. |
| 2015/0272825 A1 | 10/2015 | Lim et al. |
| 2020/0187694 A1* | 6/2020 | Santangeli ......... G07C 9/00309 |

OTHER PUBLICATIONS

Office Action from the German Patent Office dated Jul. 19, 2021 in related German patent application 10 2019 000 559.7.
English translation of International Search Report dated Apr. 14, 2020 for parent application No. PCT/EP2020/050723.
English translation of Written Opinion of the International Searching Authority for parent application No. PCT/EP2020/050723.

* cited by examiner

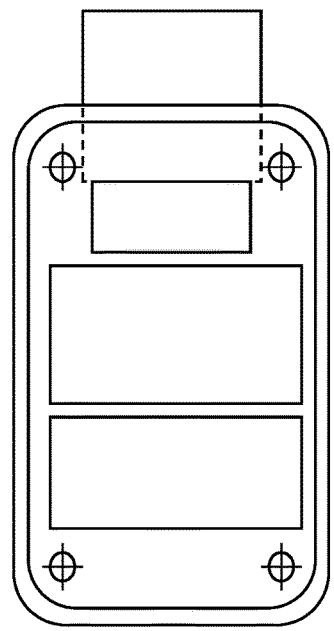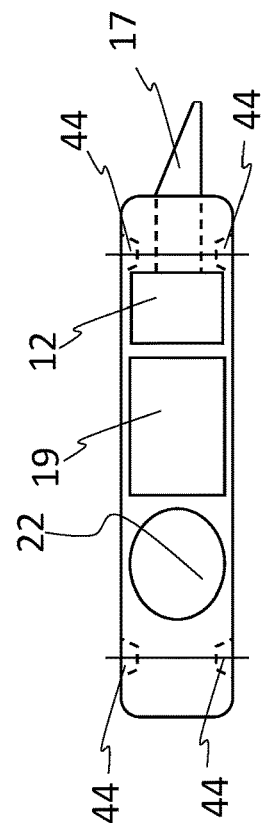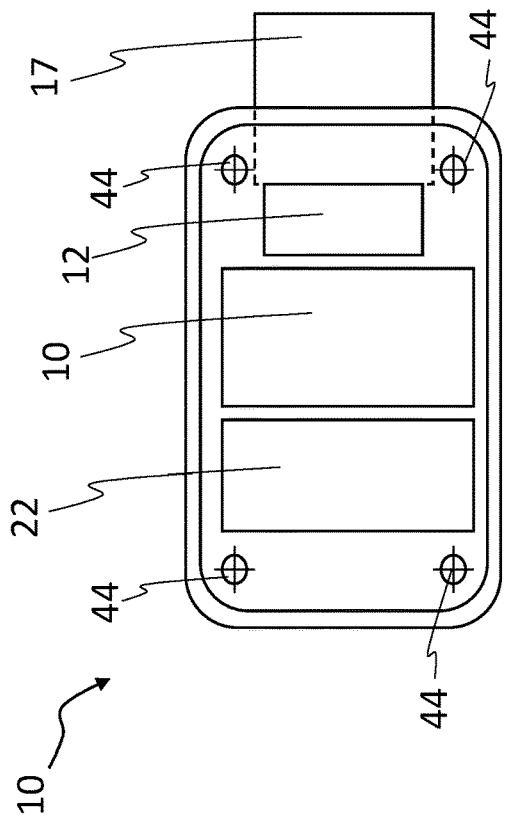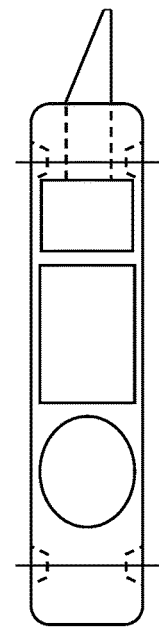

CONTAINER, METHOD, AND SYSTEM FOR ENABLING OFFLINE ACCESS CONTROL AND FOR ENABLING OFFLINE SENSOR DATA TRANSMISSION

CROSS-REFERENCE TO RELATED APPLICATIONS

This application is the U.S. National Stage of International Application No. PCT/EP2020/050723 filed on Jan. 13, 2020, which claims priority to German patent application no. 10 2019 000 559.7 filed on Jan. 25, 2019.

TECHNICAL FIELD

The present invention generally relates to a container for accommodating objects, to a method in which such a container is used, and to a system.

BACKGROUND OF THE INVENTION

Developments in the area of access control systems, in particular in the area of home automation, which link the opening of a lock to the presence of a smartphone, can be identified. A distinction can be made roughly between two versions. On the one hand, there are cases in which data from the smartphone is sent to a server via an app and from this server to the lock. On the other hand, there are solutions in which key information is already stored in the smartphone, so that direct communication takes place between the smartphone and the lock (optionally, the lock has no connection to the Internet). In both versions, the lock is opened when the transmitted data matches the stored data.

However, in order to safely change the data stored in the lock (add or delete keys, or configure time restrictions, etc.), the lock absolutely requires a connection to the Internet so that the secure transmission can take place from a central point.

If there is no connection of the lock to the Internet, then the only option left is that the lock is configured locally, as is common e.g., with RFID locks having "programming cards". However, since this is impractical in the case of a very high number and widely distributed or even mobile locks, since on the one hand all locks have to be manually updated individually—by a person who has the appropriate programming tools and configuration data and who also has the opportunity to gain access to the lock. On the other hand, the method is simply not secure, as it cannot be centrally monitored whether the reconfiguration was carried out at all for all locks or whether this was successful.

In areas where there is no internet connection or in the case of objects that cannot be equipped with a permanent data connection, secure and central management of the distributed locks is not possible today.

SUMMARY OF THE INVENTION

It is therefore an object of the present teachings to disclose techniques for improving a lockable container, a method of operating the lockable container and a system that includes the lockable container. Additionally or alternatively, improve techniques for offline access control and/or offline sensor data transmission are disclosed. In this context, "offline" means that the object itself cannot temporarily, or e.g., permanently, establish a direct connection to the Internet; e.g., it has no means for establishing such a connection.

In one aspect of the present teachings, a container for accommodating objects, such as samples having (containing) biological material, is disclosed. The container preferably has at least one main body that encloses an accommodating volume on multiple sides. Furthermore, the container preferably has an opening device, e.g., a door or flap, which is arranged or disposed so as to be movable, e.g., closable, with respect to the main body. Furthermore, a lock device is provided for preventing a defined relative movement of the opening device with respect to the main body, wherein the lock device includes an electrically operated actuator. Furthermore, a near-field data transmission device is provided for receiving data from at least one mobile terminal while the at least one mobile terminal is temporarily located in a defined distance range from the container and for sending data to the at least one mobile terminal that is temporarily located in the defined distance range from the container. Furthermore, a memory unit is provided for temporarily storing time data and access data, wherein the time data include at least data with respect to the last opening time and/or at least data with respect to the last closing time. Furthermore, the access data include at least authorization data and identification data; the authorization data define, depending on which identification data, the actuator converts the lock device from a closed configuration to an open configuration; the identification data specify an assignment to the mobile terminal, e.g., to a defined application or program, e.g., in a cloud-based manner, that is executed or executable on the mobile terminal. Furthermore, a processor device is provided for comparing the authorization data and the identification data, wherein the actuator is controllable by the processor device for opening the lock device in the event of a positive comparison that represents a defined match of the compared data. Furthermore, an energy source different from a fixed power connection is provided for operating at least the actuator, the near-field data transmission device, the memory unit and the processor device. Preferably only those connections that draw electricity by means of a cable connection from a supply infrastructure and thus from a power plant, such as a coal-fired power plant, wind power plant, hydroelectric power plant or solar power plant, particularly preferably from at least 100 m or 1000 m or 2 km or 3 km or 5 km or 10 km away, serve as a fixed power connection in the present context. Particularly preferably, the object for data transmission only has the near-field data transmission device and thus particularly preferably no far-field data transmission device, e.g., no device for generating a cellular data connection, such as e.g., a GSM, UMTS or LTE connection.

This solution or configuration is advantageous because the object can be used or operated independently of a stationary infrastructure. Furthermore, a wide variety of data relating to the use of the container can be recorded and made available. Because the container preferably does not have a far field data transmission device, the costs for the container can be very low. In addition, the total energy requirement of the electrical components of the container is very low as a result. The container can additionally or alternatively be equipped with IoT transmission technologies, such as, narrowband IoT and/or LORA WAN.

Further preferred embodiments of the present teachings are the subject matter of the dependent claims and/or the following parts of the description.

According to one preferred embodiment of the present teachings, the processor device, the memory unit and the near-field data transmission device and preferably also the energy source are designed as part of the lock device, wherein the processor device, the memory unit and the near-field data transmission device are arranged inside the container in the closed configuration of the container. This embodiment is advantageous because there are very short data transmission paths and very short energy transmission paths. Furthermore, the base body of the container and the lock device can be manufactured separately from one another. Furthermore, it is possible that the present teachings relate alternatively to such a lock device. This can be advantageous because the lock device can thus be used in different containers.

According to a further preferred embodiment of the present teachings, one or at least one temperature sensor is arranged inside the container or on a wall of the container. The temperature sensor(s) output(s) temperature values that are storable by the processor device in the memory unit in the form of data or temperature data that are storable by the processor device in the memory unit together with time data and/or access data. This embodiment is advantageous because it can be determined, e.g. as a function of the time, to what temperatures the objects disposed in the container were exposed. Thus, for example, in the case of samples of biological material, predictions can be made as to whether these samples can still be analyzed or whether they must be regarded as rejects (spoiled). This has the advantage that samples deemed to be rejects are not analyzed unnecessarily, which improves capacities and reduces costs.

According to a further preferred embodiment of the present teachings, one or at least one humidity sensor is arranged inside the container or on a wall of the container. The humidity sensor(s) output(s) humidity values that are storable by the processor device in the memory in the form of data or humidity data that are storable by the processor device in the memory together with time data and/or access data and/or temperature data. This embodiment is advantageous since effects on the objects held in the container can thereby be determined. The humidity sensor(s) can, e.g., also serve to detect whether liquid is emerging from the object, e.g., leaking or evaporating. Thus, for example, changes in the concentration of the liquid held in the object can be determined. Additionally or alternatively, defects of the object and thus leakages can be detected.

According to a further preferred embodiment of the present teachings, one or at least one weight sensor is arranged in a wall forming the bottom of the container or on the wall forming the bottom, wherein the weight sensor outputs weight values or weight data. The processor device preferably stores the weight values in the memory unit in the form of data and/or stores the weight data in the memory unit together with time data and/or access data and/or temperature data and/or humidity data. This embodiment is advantageous because whether an object is disposed in the container can be detected by using the weight data. Additionally or alternatively, it can be determined in this way whether the object is the correct object, in other words, whether the correct object or another object has been placed in the container. Data with respect to the object are preferably recorded by means of a registration device, which is preferably not part of the container, before the positioning of the object in the container is detected. In this case, the registration device can temporarily or permanently establish a connection to the Internet and preferably transmits object-specific data and/or container-specific data to the server device. The server device preferably transmits the object-specific data and/or the container-specific data to the mobile terminal. The container then transmits the sensor data to the mobile terminal and the mobile terminal preferably performs a comparison of the registered data with the actual data of the container. Depending on the object, this comparison can be used to overwrite or replace opening data for opening the container, wherein the container remains closed if the comparison should result in deviations that are above a defined threshold value. This can be important, e.g., for objects that contain hazardous substances such as poison, viruses, bacteria, spores, etc.

According to a further preferred embodiment, energy source data is generatable by the processor device, wherein the energy source data include data with respect to the charge level and/or the degree of discharge over a defined period and/or with respect to the change in voltage over a defined period. This embodiment is advantageous because, e.g., a replacement of the energy source can be made in accordance with this data.

According to yet another preferred embodiment of the present teachings, the container in the closed configuration delimits a volume of less than 10 m$^3$, e.g., less than 5 m$^3$ or less than 2 m$^3$ or less than 1 m$^3$ or less than 0.5 m$^3$ or less than 0.1 m$^3$, and/or it houses or encloses this. Additionally or alternatively, the mean wall thickness of the walls of the container is preferably less than 30 mm thick, e.g., less than 20 mm or less than 10 mm thick or is between 20 mm and 8 mm thick or less than 5 mm thick or less than 3 mm thick. Additionally or alternatively, in the closed configuration the opening device overlays a wall extending parallel to the opening device by at least 50% (of the wall surface), e.g., at least 60% (of the wall surface) or at least 80% (of the wall surface) or at least 90% (of the wall surface). Additionally or alternatively, the walls include one or at least one metal or one or at least one polymer material or one or at least one composite material or are composed of at least 50% (in terms of weight), e.g., at least 60% (in terms of weight) or at least 70% (in terms of weight) or at least 80% (by mass) or at least 90% (by mass) from one of these materials. Additionally or alternatively, the energy source may be a battery having a minimum capacity or electrical charge of at least or exactly or up to 500 mAh or at least or exactly or up to 1400 mAh or at least or exactly or up to 2000 mAh or at least or exactly or up to 3000 mAh or at least or exactly or up to 10000 mAh or at least or exactly or up to 15000 mAh or at least or exactly or up to 25000 mAh or at least or exactly or up to 50,000 mAh or at least or exactly or up to 100,000 mAh. Additionally or alternatively, the near-field data transmission device can be an RFID, Bluetooth®, WLAN, ZigBee® and/or Z-Wave® data transmission device.

In another aspect of the present teachings, a method may preferably include: providing a container, e.g., a container described herein, and providing a mobile terminal that includes: a near-field data transmission means for data exchange with the near-field data transmission device of the container; a far-field data transmission means, e.g., LTE, for data exchange with a server; a processor device for executing a control application; and a memory device for storing container reconfiguration data and container operating data. The container operating data are transmitted by the near-field data transmission device to the near-field data transmission means of the mobile terminal to be forwarded to the server device and the mobile terminal receives the container reconfiguration data from the server via the far-field data transmission means. The container reconfiguration data are generated in response to the container operating data transmitted to the server by means of the near-field data transmission means, wherein the container operating data include at least time data and access data.

Such a method is advantageous because it makes possible a secure assignment of unique access rights (e.g., key for an electronic lock) without the use of specialized hardware (e.g., RFID token or mechanical key), as well as without an existing internet connection (at the time of opening/no "realtime" query from a server).

It is particularly advantageous here that different (changing) persons and/or mobile terminals can have access to a specially protected area. The access is preferably managed electronically and the granting is preferably configured granularly; i.e. an access authorization can be granted and/or revoked, e.g., in a point-in-time-dependent or time range-dependent manner and/or in a user-dependent manner and/or in a location-dependent and/or priority-dependent manner. Thus, e.g., the opening of a specific container can be made possible only on a specific day in a precisely defined time window. In this context, "priority-dependent" preferably means that a user and/or a terminal having higher authorization can open the container even if another user and/or another terminal has already registered the container.

If the terminal of a user does not have an existing Internet connection, then he/she cannot use a "key server" at the time at which he/she would like to open the lock or the lock device, e.g., by entering the lock ID, to ask whether he/she has the authorization to open the lock or request the necessary key. Applications here, among others, are access rights to electronic locks in areas not supplied with mobile internet (radio gaps, nature reserves, under ground, under water, etc.).

According to a preferred embodiment of the present teachings, the time data include at least data with respect to the last opening time and/or at least data with respect to the last closing time. Here, the access data preferably include authorization data and identification data, wherein the authorization data defines, in dependency of which identification data, the actuator converts the lock device from a closed configuration to an open configuration, and wherein the identification data specify an assignment to the mobile terminal.

This solution is also advantageous because the "key carrier" or the user has a mobile device that is basically equipped with a permanent Internet connection. An application is preferably installed on the mobile device that synchronizes itself regularly and/or at defined times and/or as a function of defined events, e.g., position data, with a key server on which the access rights for the "key holder" are managed, or actively transfers changes to the rights to the application.

The transmission preferably takes place in an encrypted manner so that the actual key does not appear in plain text. In addition, the system times are preferably synchronized so that deviations in the local time of the key carrier can be compensated (if access is only to be granted in a time window). If the "key carrier" now reaches the container that is to be opened, the unique lock ID must be transmitted to the application (e.g. typing in, via barcode, transmission via Bluetooth® or another wireless technology). The application of the mobile device now checks locally whether there are access rights. If the check is positive, the "key carrier" receives access, in which the code is displayed to him/her or the signal to open the lock is transmitted from the application via radio waves (e. g., Bluetooth®).

With such a method, using defined devices and technologies (mobile phone, mobile internet access, mobile application, key server, encryption, secure transmission technologies) and preferably without the use of specialized hardware, different accesses for multiple users can be managed online, even if it cannot be guaranteed that there is an online connection at the time of access to the protected area.

According to a further preferred embodiment of the present teachings, the container has at least one sensor that provides data and/or signals to the processor device of the container and the near-field data transmission device of the container transmits signals and/or data, which represent the sensor data or sensor signals, as part of the container operating data to the near-field data transmission means of the mobile terminal. Identification data provided by the server or the server device are preferably provided in the memory unit of the mobile terminal, wherein the identification data is transmitted to the mobile terminal together with the container reconfiguration data or as a separate data record. The identification data are preferably transmitted together with specific device data of the mobile terminal as a result of an access authorization request via the near-field data transmission means to the near-field data transmission device. Particularly preferably, at least the identification data are stored in the memory unit and are compared with authorization data present (stored) in the memory unit. Depending on a comparison result resulting from the comparison, the lock device remains in the locked state or is converted to an open state (the above-described open configuration). A specific set of container operating data is preferably provided or written or stored by the processor device of the container in a modified form in the memory unit, at least after this set of container operating data has been transmitted to the mobile terminal. Here, the container reconfiguration data of the processor device of the container preferably specify which data, e.g., which specific set of container data, is deleted from the memory unit, wherein the processor device of the container deletes the data from the memory unit in accordance with the container reconfiguration data. The container reconfiguration data preferably include authorization data and an instruction to the processor device of the container to replace and/or augment the authorization data held in the storage unit with the authorization data of the container reconfiguration data.

A computer program product for executing such a method is also disclosed herein.

Furthermore, a system that may include, e.g., the above-described container and/or the above-described mobile terminal is also disclosed herein.

For example, such a system preferably includes at least multiple containers, e.g., containers described herein, and multiple mobile terminals. Each mobile terminal includes: a near-field data transmission means for data exchange with the near-field data transmission devices of the containers; a far-field data transmission means, e.g., LTE, for data exchange with a server; a processor device for executing a control application; and a memory device for storing container reconfiguration data and container operating data. The container operating data are preferably transmitted by the near-field data transmission device to the near-field data transmission means of the respective mobile terminal for forwarding to the server device. The container operating data include at least time data and access data, wherein the time data preferably includes at least data with respect to the last opening time and/or at least data with respect to the last closing time. Furthermore, the system preferably includes one or at least one server device, e.g., a cloud server device. The server device preferably receives the container operating data from the respective mobile terminal and after receiving the container operating data the server device generates container reconfiguration data. These container reconfiguration data are sent from the server device to the mobile terminal or to several mobile terminals or to defined (pre-determined) mobile terminals. The server device preferably sends the container reconfiguration data to the mobile terminal from which it received the container operating data or it sends the container reconfiguration data to another mobile terminal that is assigned to the container, or it sends the container reconfiguration data to a group of mobile terminals, wherein preferably a single one of, multiple, the majority of or all of the mobile terminals assigned to the group are assigned to the container.

Further advantages, objectives and properties of the present teachings are explained with reference to the following description of the attached drawings, in which a representative method according to the present teachings is shown by way of example. Components or elements that are preferably used in the representative method and/or which at least essentially correspond in terms of their function in the figures can be identified with the same reference symbols, although these components or elements need not be numbered or explained in all figures.

BRIEF DESCRIPTION OF THE DRAWINGS

FIGS. 1a-1d show, purely schematically, a top view, a bottom view and two side views, respectively, of an example of lock device for a container according to the present teachings.

DETAILED DESCRIPTION OF THE INVENTION

Figure 2:
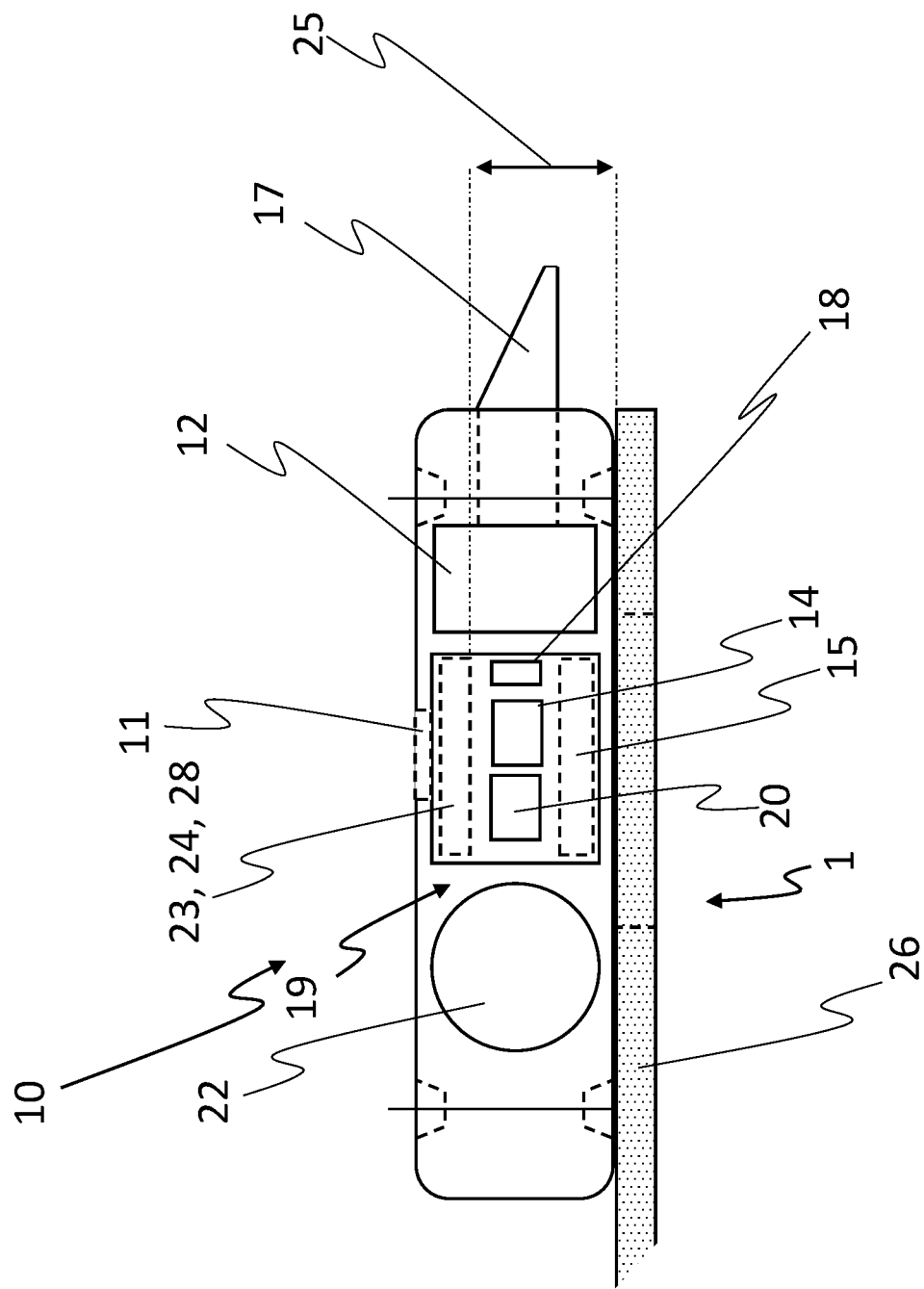
FIGS. 2 and 3 show additional views of the lock device arranged on a wall of a container.
Figure 3:
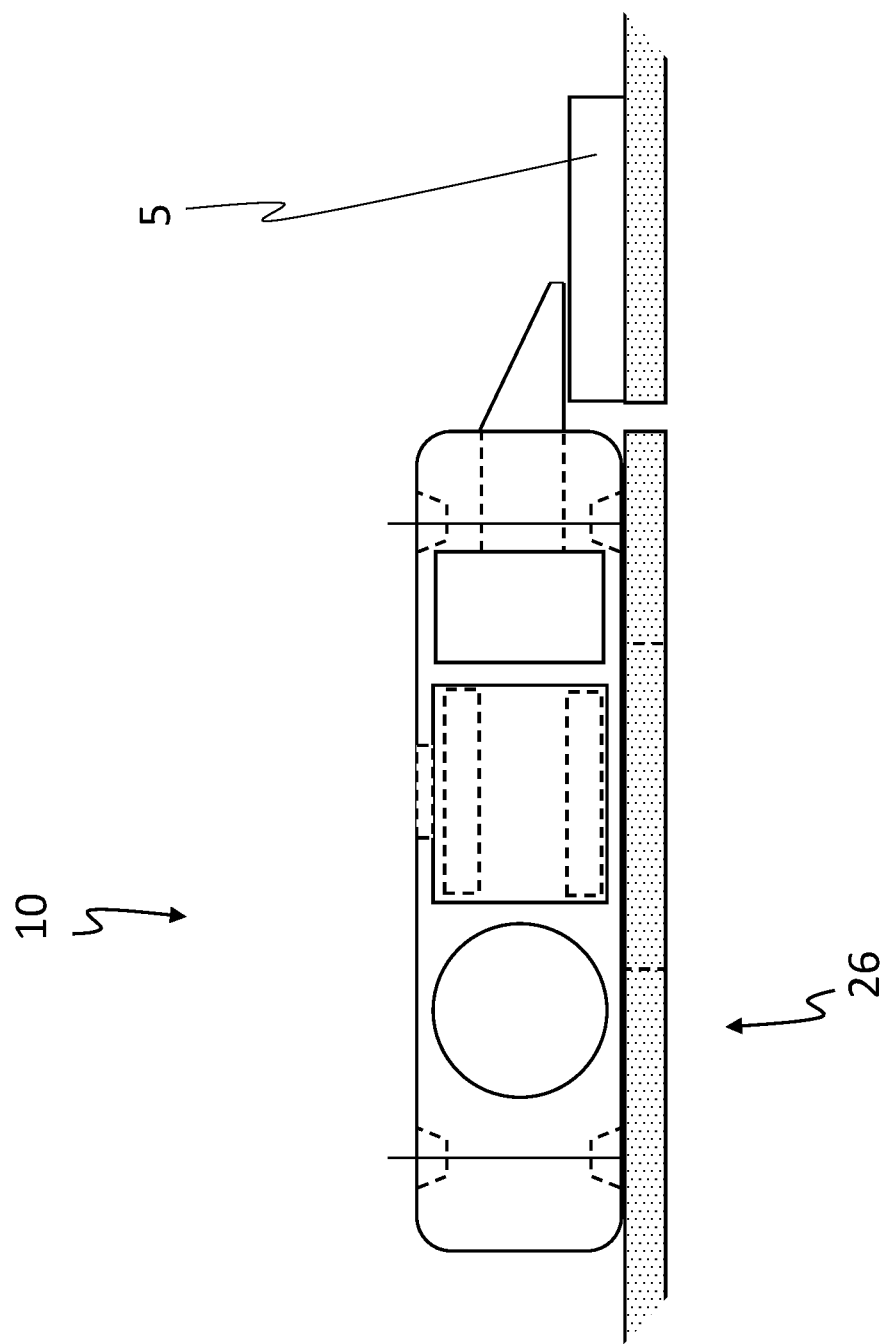

FIGS. 1a-1d, 2 and 3 schematically show a lock device 10 for preventing a defined relative movement of an opening device 8 with respect to the main body 4.

The lock device 10 preferably includes an electrically operated (electrically driven) actuator 12.

Furthermore, at least or precisely one sensor device or a sensor is arranged in the lock device 10.

The sensor(s) is/are preferably directly installed in the lock unit or lock device 10. Additionally or alternatively, the possibility can exist to connect one or multiple sensors (e.g., further sensor(s)) directly to the lock device 10 via connection cables or a suitable near-field radio technology (then the sensor(s) need its/their own power supply), e.g. to collect sensor data at a more suitable place (e.g., temperature measurements at different places in the box). With some sensors, detection of a property directly in the lock unit is also not possible (e.g., weight sensor is provided separately from the lock device 10 in order to detect the weight of an object placed in the container 1, as will be further described below).

The container 1 has an interior space and at least one wall that delimits the interior space from the surroundings. The lock device 10 is arranged (disposed) on a wall of the container 1 or on an opening device 8 that is movable relative to the wall, e.g., on a displaceable or pivotable flap, window or door. The side of the lock device 10 that is arranged on the wall is preferably considered to be the outer side of the lock device 10; the side of the lock device 10 that is essentially parallel or opposite thereto is considered to be the inner side. One, multiple or all of the sensors in the lock device 10 are arranged closer to the inner side of the lock device 10 than to the outer side. Thus, between the sensor and/or the sensor device or the sensors and the wall, e.g., the contact point of the lock device with the wall, there is preferably a distance between 3 mm and 50 mm, e.g., between 5 mm and 20 mm or between 8 mm and 18 mm or at least 5 mm or at least 10 mm to the outer wall of the container. This is advantageous because a thermal decoupling (applies e.g., to a temperature sensor 24 and/or a humidity sensor or an air humidity sensor 29) is created.

There is a possibility that one or more of the sensors is/are provided and/or installed as an analog sensor. An A/D conversion can then preferably be implemented using a corresponding function or device, e.g., the processor device or an A/D converter unit, in the lock unit or in the lock device 10. Additionally or alternatively, a digital sensor or several digital sensors can be provided and/or connected and/or installed. Because one or more such digital sensors already deliver(s) digital measurement parameters, the digital signals from the lock unit can be processed without further conversion.

One or at least one or more fingerprint sensors can also be connected to the lock device 10, so that people who want to open the container or receptacle 1 can identify themselves with their fingerprint (e.g. for the highest security requirements). In this case, the fingerprint sensor can also or alternatively be located in the mobile terminal 16 and the recorded data can be transmitted to the near-field data transmission device 14 of the lock device 10 via the near-field data transmission means 34 of the mobile terminal 16 for comparison by the processor device 20 of the lock device 10.

Furthermore, light-emitting diodes (not shown) can be connected to the lock device 10. Additionally or alternatively, e.g., on the outer side of the container 1, different information can be communicated and/or distributed to the outside by using different colors and/or "blink codes". Additionally or alternatively, there is the possibility of connecting graphic displays to the lock unit. Due to the low power consumption, ePaper or electronic paper are preferably used here. For example, in the event that information is only displayed for a short time, all other conventional display technologies can also be used (esp. LED segment displays, LCD displays and/or graphic LCD or TFT or OLED displays).

FIG. 2 shows the lock device 10 arranged on an outer wall 26 of the container 1. The lock device 10 preferably has an energy source 22, e.g., a battery, an electronic unit 19, an actuator unit 12 and a bolt 17 that is movable by means of the actuator unit 12, e.g., an electric motor. The electronic unit 19 preferably includes a processor device 20, a memory unit 18, a near-field data transmission means 14, an antenna unit 15 and a sensor device 23. The aforementioned devices of the electronic unit 19 are preferably connected at least indirectly to the processor device 20. The sensor device 23 can include one or more sensors, e.g., a humidity sensor 29 and/or a temperature sensor 24. The sensor device 23 is arranged in the housing of the lock device 10, wherein the lock device 10 preferably has a recess or an opening 11 in the direction of the interior of the container or facing away from the next container wall, which can preferably be open or covered with a membrane. The sensor device 23 is preferably spaced at a distance, which is represented by reference number 25, of at least 2 mm, e.g., at least 4 mm or at least or exactly or up to 5 mm or at least or exactly or up to 8 mm or at least or exactly or up to 10 mm or at least or exactly up to 15 mm, with respect to the outer wall 26 on which the lock device 10 is arranged or formed.

Figure 4:
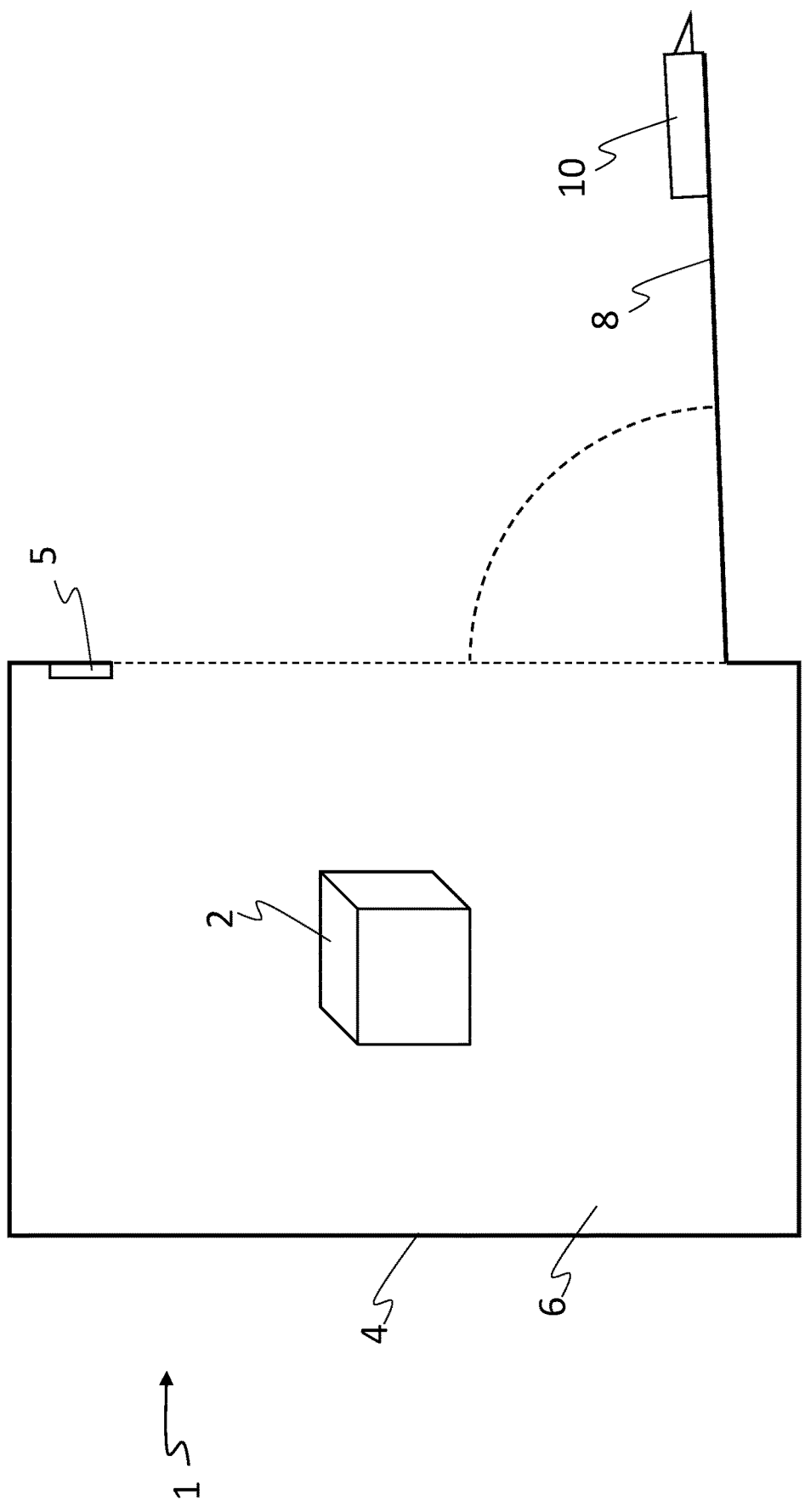
FIGS. 4-6 show respective containers including the lock device.
Figure 5:
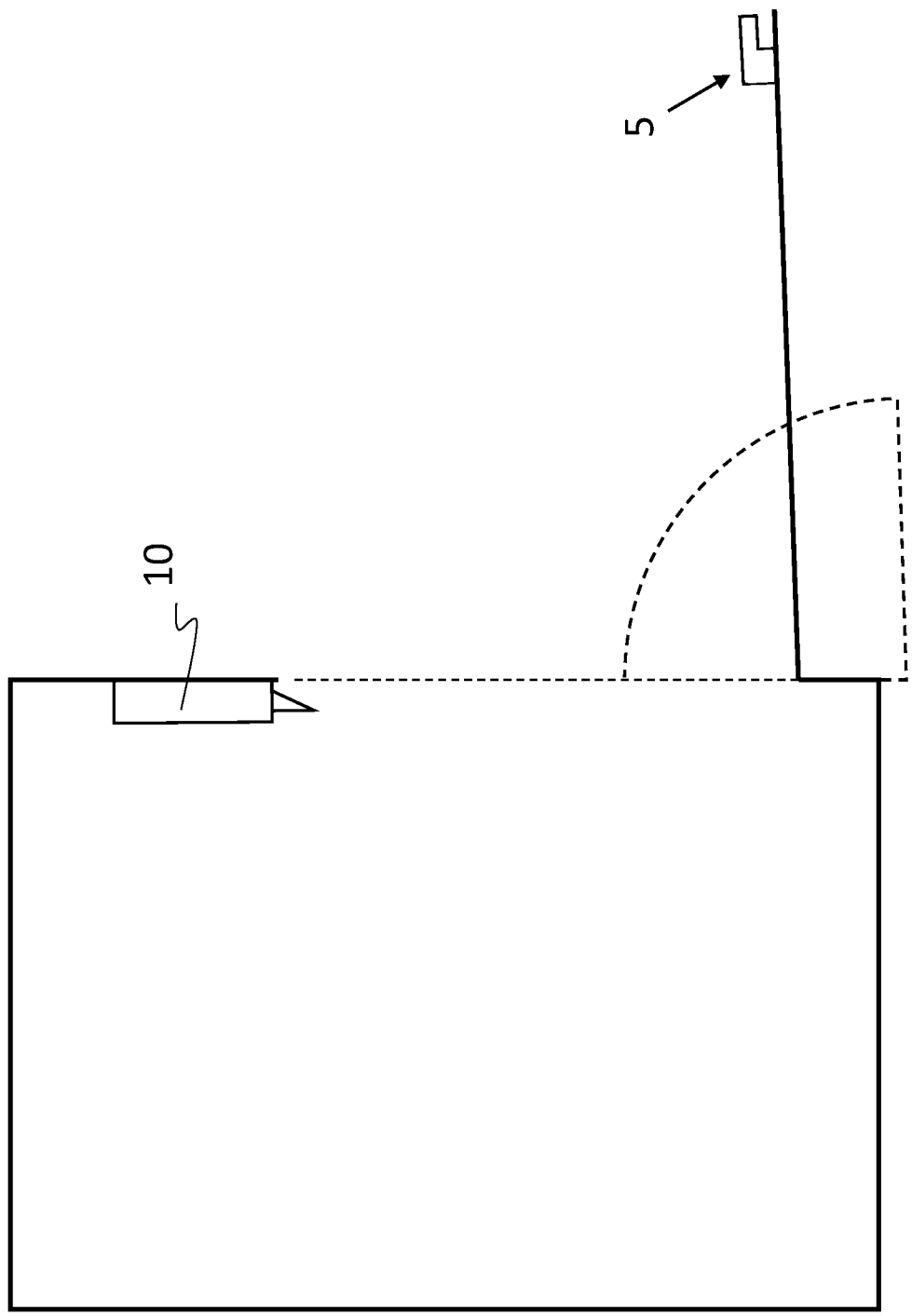

FIGS. 4 and 5 schematically show different designs of the container 1. According to FIG. 4 (and FIG. 3), the lock device 10 is arranged on the door; the container 1 or the container wall includes a receiving part 5 for receiving the bolt 17 in the closed (locked) configuration or forms it. According to FIG. 5, the door or the opening device 8 forms the receiving part 5 and the lock device 10 is arranged on or in the container wall.

Figure 6:
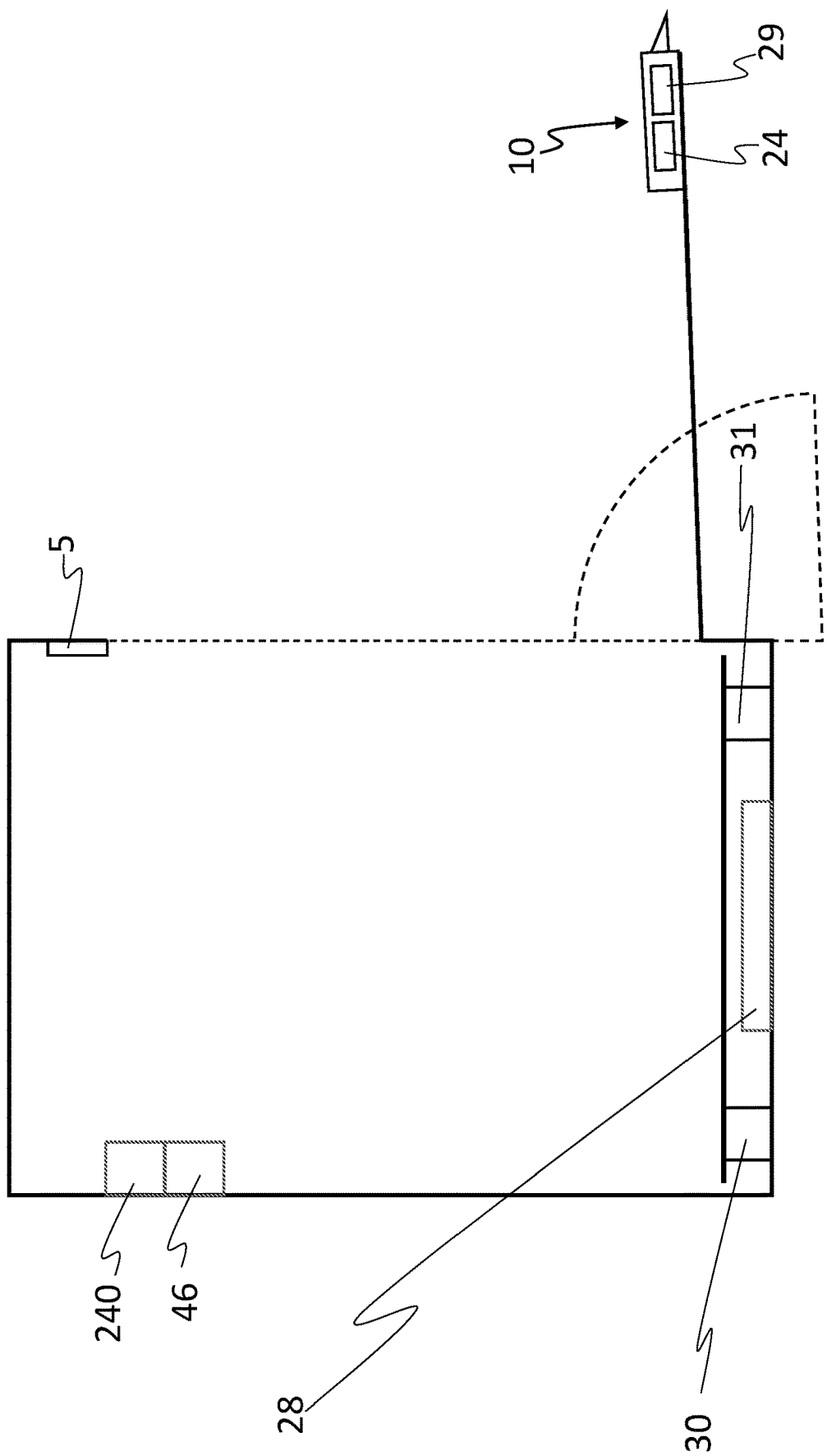

FIG. 6 shows purely schematically that the container 10 can also be equipped with one sensor or with several sensors, as will be further described below.

Depending on the size and nature of the container 1, one or more weight sensors 30, 31 may be installed on the bottom of the container 1, e.g., using a "double bottom" so that the weight of a deposited object can be reliably detected, particularly preferably regardless of the shape or size of the object and/or independently of the location in the container 1 at which the object or the object 2 is deposited (placed). The connection of the weight sensor(s) to the lock device, e.g., the signal and/or data-technical coupling with the processor device 20 of the lock device 10, can take place in a wire-connected or circuit board-connected manner or by a suitable near-field radio technology.

A vibration sensor or multiple vibration sensors, e.g., acceleration sensor(s) 46, can be installed in the container 1, e.g., in the area of the wall, e.g., on the floor, or in the lock device 10. The acceleration sensor(s) 46 record(s) the acceleration values to which the container 1 is exposed (subjected). Furthermore, the container 1 can include a further temperature sensor 240, e.g., in the upper area, i.e. above the center of the container 1, or in the lower area, i.e. below the center of the container 1, or in the area of the center of the container 1. In this context, "in the area of the center" is to be understood in terms of height as +/−10% or +/−20% or +/−30% or +/−40% above and/or below the (vertical) center and/or the vertical middle. The height percentages relate to the maximum height of the accommodation space.

An air pressure sensor (not shown) or multiple air pressure sensors can be installed in the container 1, e.g., in the area of the wall, e.g., on the floor, or in the lock device 10, which record(s) the air pressure changes to which the container 1 is exposed (subjected). Additionally or alternatively, one or more gas sensors can be provided in the container 1, e.g., in the area of a wall, e.g., on the floor or on the cover of the container 1. These embodiments are advantageous because the environmental conditions in the area of the container 1 can be recorded very precisely thereby, e.g. in transport containers that are transported by aircraft.

In addition, a motion sensor or different motion sensors can be connected to the lock device 10 in order to e.g.—should the container 1 be designed as a mailbox or like a mailbox—to recognize that an insertion or a placement has taken place. Here, depending on the application, one or more light sensor(s), infrared-, ultrasonic- and/or magnetic field sensors come into consideration here.

Another type of sensor that comes into consideration would be a humidity sensor or a liquid sensor that is e.g. analogous to the weight sensor(s) for logical reasons to be installed on the bottom of the container 1 in order to determine whether liquids in the container 1 have leaked.

To determine whether e.g. a mobile transport box has overturned or a prescribed maximum inclination has been exceeded, a gyroscope sensor (gyro instrument) can be coupled to the lock device, e.g., connected, or built into it.

Furthermore, there is additionally or alternatively the possibility of connecting a GPS receiver to the lock device 10 or of integrating it.

FIGS. 7 to 10 show, purely schematically, an example of a sequence of a representative method for opening a container 1.

Figure 7:
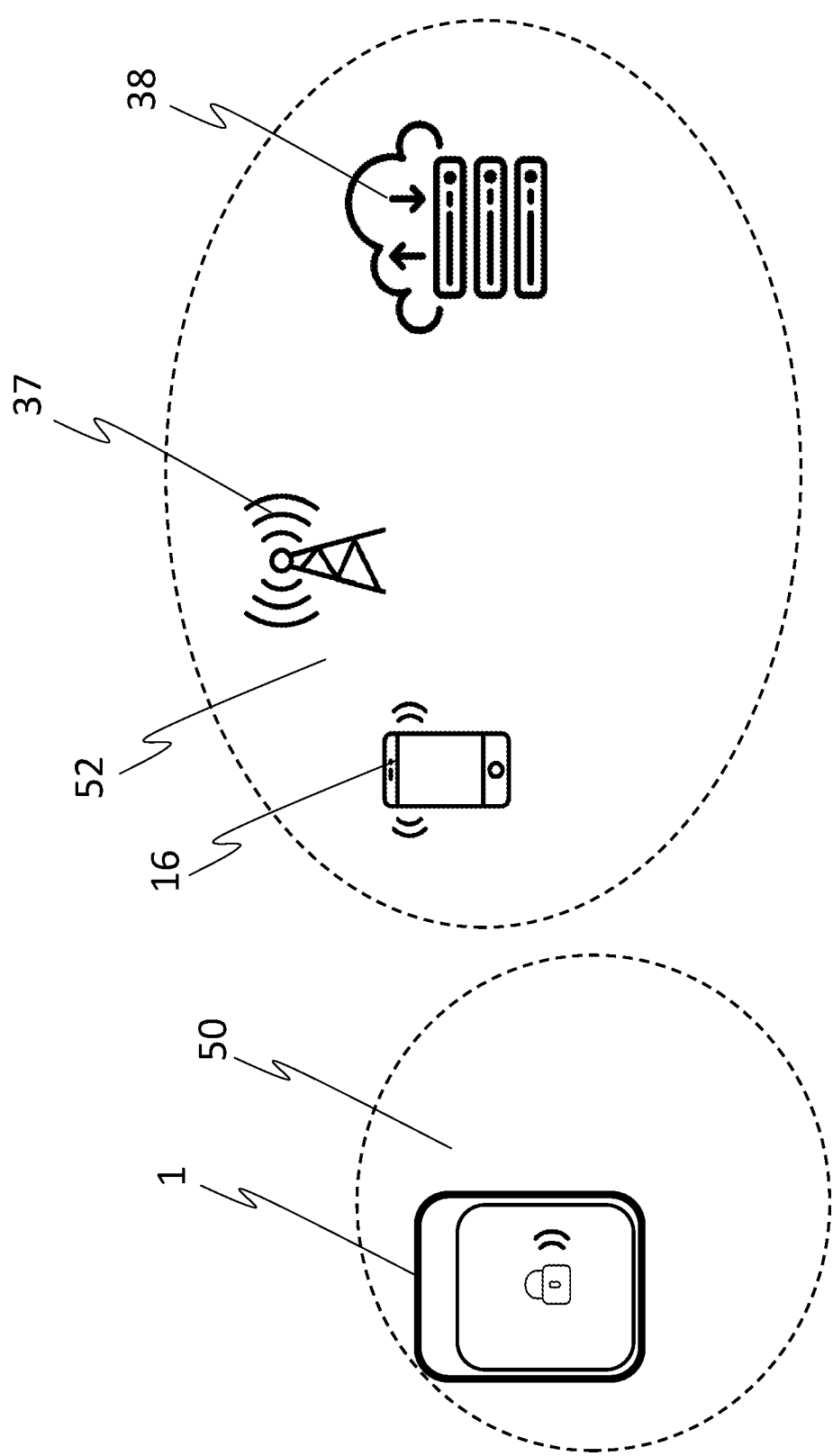
FIGS. 7 to 10 show, purely schematically, an example of data transmission in accordance with a method or system according to the present teachings.

It can be seen that a container 1, e.g., a protected container without a permanent Internet connection, is provided, wherein the container 1 includes a near-field data communication device (14—see e.g., FIG. 2) and thereby defines a near field communication area 50, as shown in FIG. 7.

Furthermore, at least one mobile terminal 16 is provided, e.g., a plurality of mobile terminals, e.g., more than 5 per 100 $km^2$ or more than or up to 10 per 100 $km^2$ or more than or up to 15 per 100 $km^2$ or more than or up to 25 per 100 $km^2$ or more than or up to 50 per 100 $km^2$ or more than or up to 100 per 100 $km^2$ or more than or up to 200 per 100 $km^2$ or more than or up to 500 per 100 $km^2$.

The mobile terminal 16 includes a near-field data transmission means 34 for data exchange with the near-field data transmission device 14 of the container 1 and furthermore it preferably includes a particularly preferable wireless far-field data transmission means 36, e.g., GSM, UMTS, LTE, etc., for data exchange with a server 38 within the coverage area 52 of a far-field communication infrastructure.

Furthermore, according to the representative method, a far-field transmission infrastructure 37, e.g., one or more transmission stations, e.g., transmission towers, is used. The far-field data transmission means 36 sends and preferably receives data at the same time or at different times or sometimes at the same time. The far-field data transmission means 36 receives the received data via the far-field transmission infrastructure 37 that receives data from a server or a server device 38, e.g., a cloud server. The transmitted data are transmitted from the far-field data transmission device 36 to the transmission infrastructure 37 for forwarding to the server 38 or the server device.

The mobile terminal 16 includes a processor device 40 for executing a control application, and the mobile terminal 16 also has a memory device 42 for storing container reconfiguration data and container operating data. Preferably, all data that is transmitted from the central server unit 38 or the lock unit 10 to the mobile application (16) and (temporarily) stored there is protected from external access by encryption, e.g., by local encryption. This means that neither the user of the application himself/herself nor a third party can directly access the data stored in the mobile application, e.g., not by reading out the physical memory of the mobile device. The encryption method and/or the exact parameters of the encryption are preferably configured centrally by the administrator of the server unit and transmitted from there to the mobile application.

Figure 8:
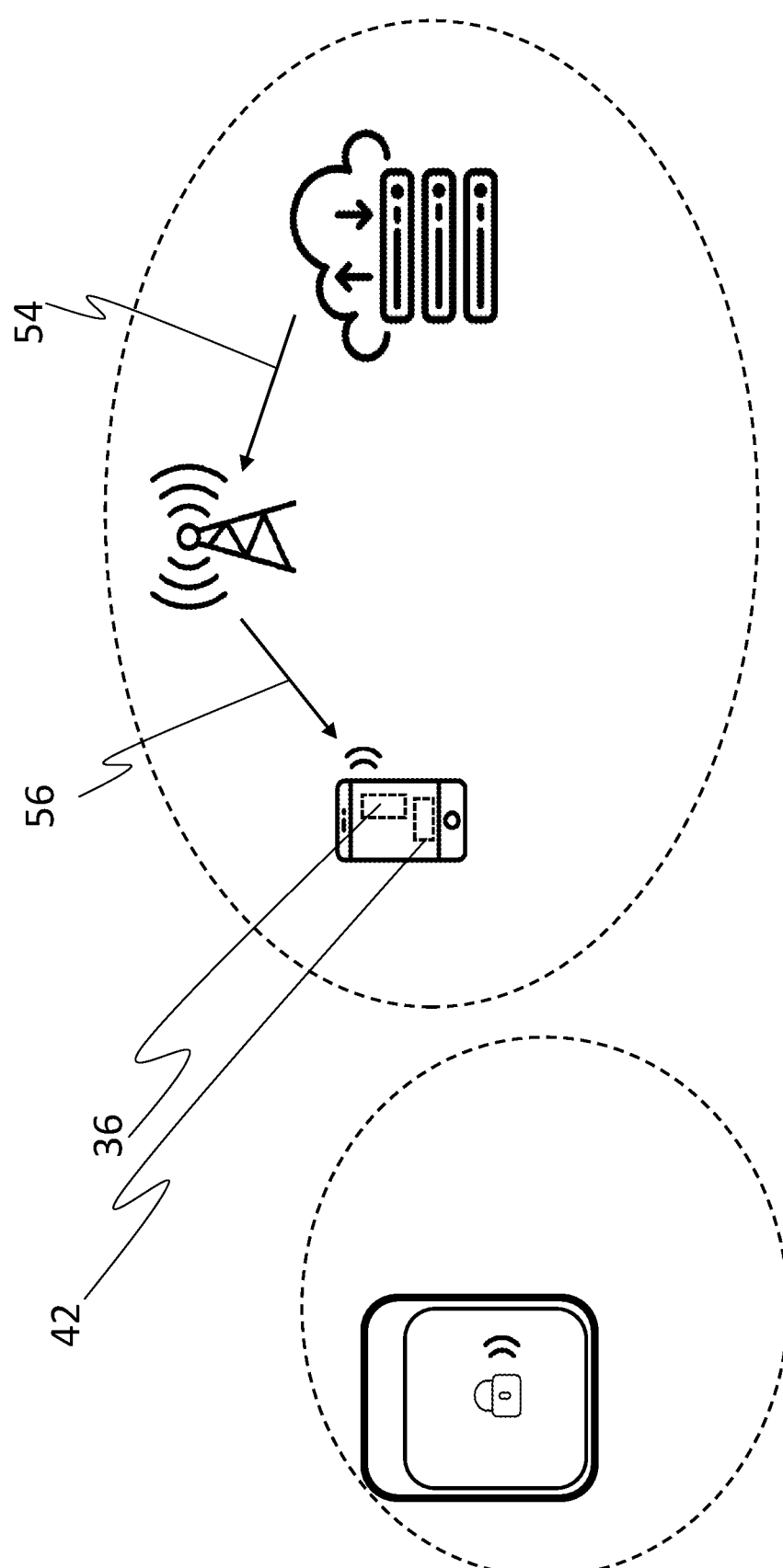

In FIG. 8 it is schematically depicted that the mobile terminal 16 receives access data from a server 38 or a server device, wherein the access data is transmitted (see communication paths 54, 56) via the transmission infrastructure 37.

The user rights and/or the lock configurations, and preferably the transmissions of all relevant sensor data or other data from the lock units, is/are managed by one or more operators/administrators.

Figure 9:
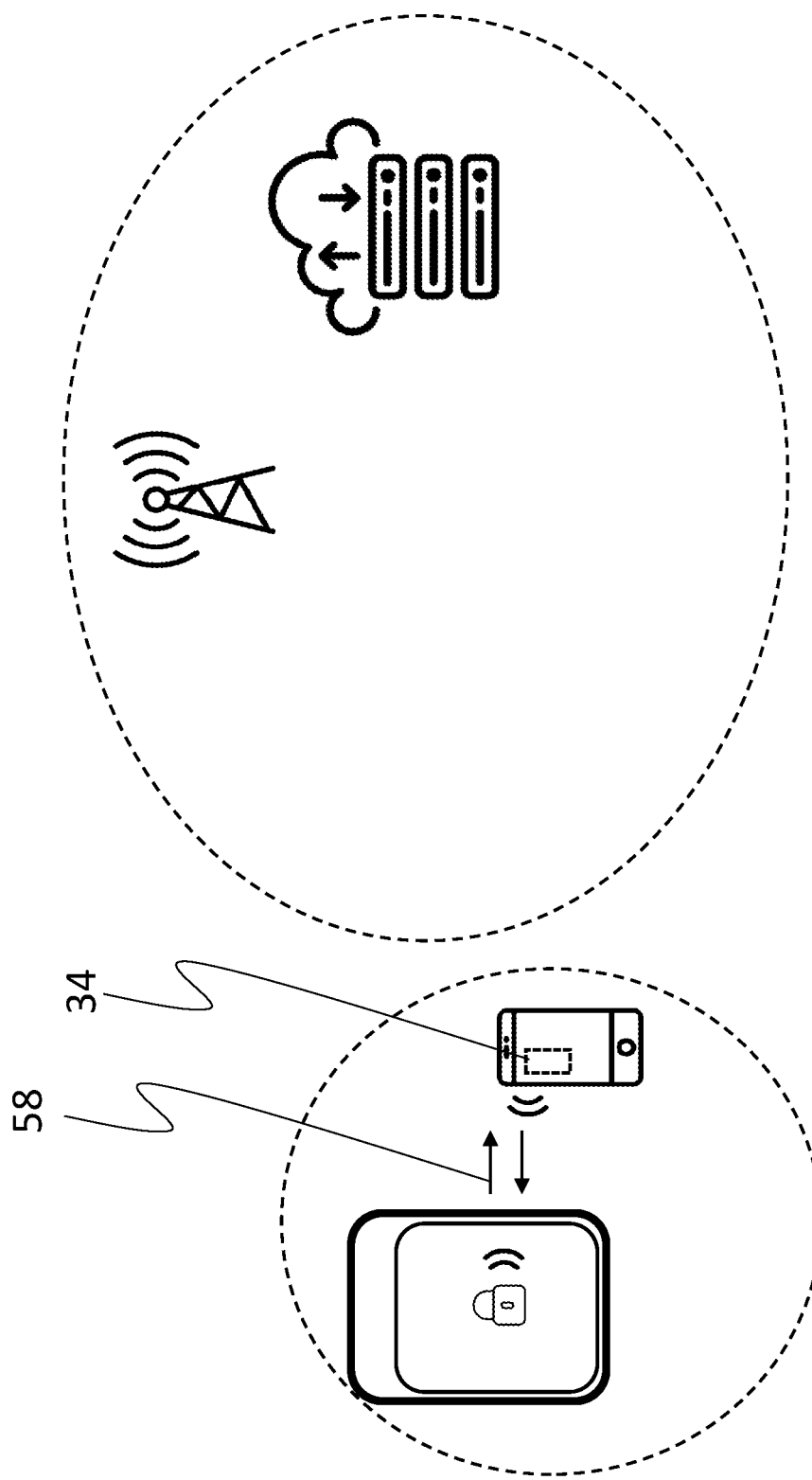

In FIG. 9 it is shown schematically that the mobile terminal 16 transmits the access data to the container via the near-field data transmission device (see communication path 58). The container operating data are then transmitted by the near-field data transmission device 14 to the near-field data transmission means 34 of the mobile terminal 16 for forwarding to the server device. It can be seen in a purely schematic manner that the mobile terminal 16 is outside the range of the transmission infrastructure or cannot establish a mobile data connection to the Internet.

Figure 10:
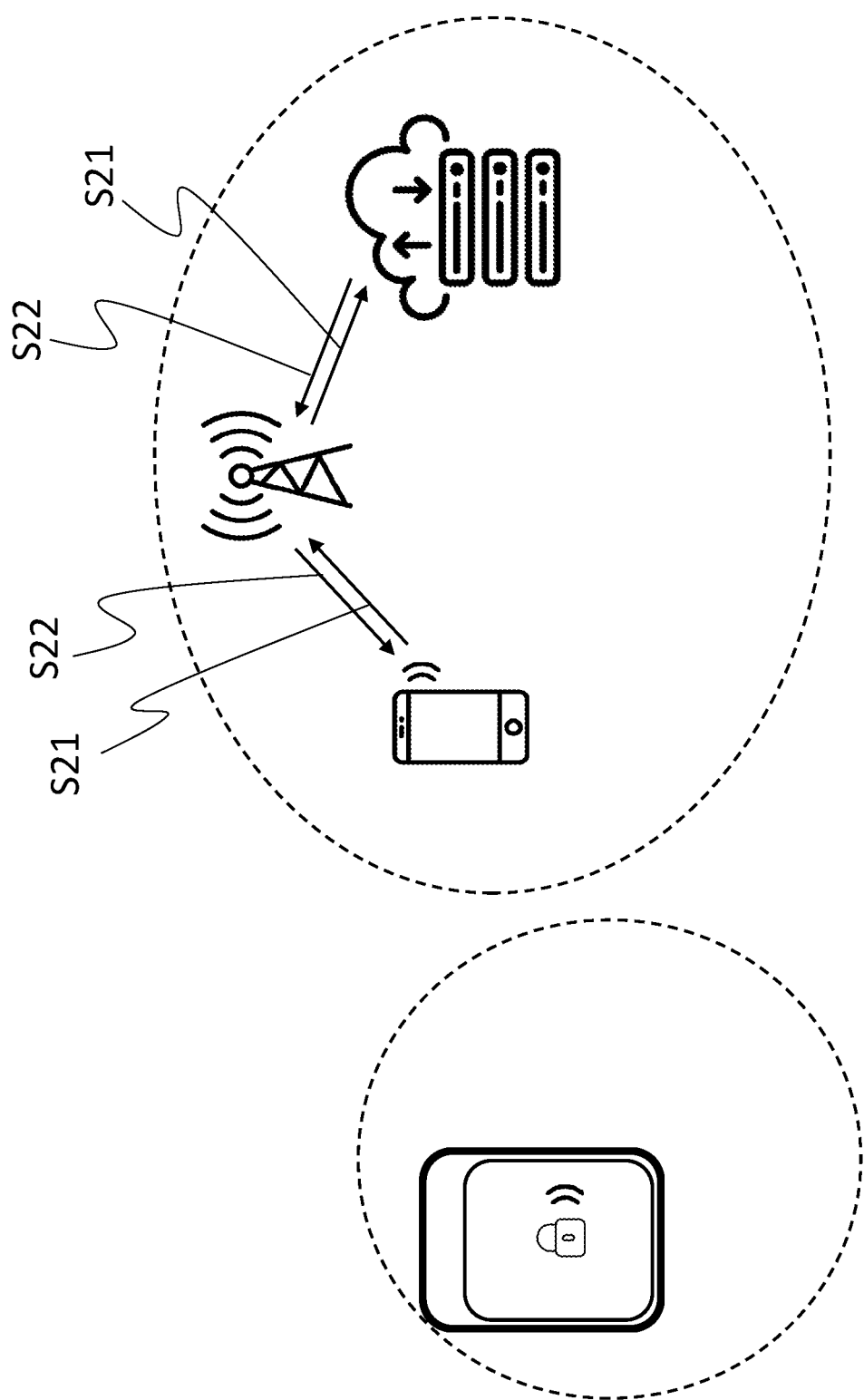

FIG. 10 shows schematically that the mobile terminal 16, as soon as it is back in the coverage area (52) of the transmission infrastructure (37) or as a result of a defined triggering event (only with an existing data connection to the Internet), e.g., a key actuation and/or a location data comparison and/or a time comparison, transmits container operating data to the server or the server device.

The mobile terminal 16 receives the container reconfiguration data from the server 38 via the far field data transmission means 36, wherein the container reconfiguration data are generated in response to the container operating data transmitted to the server 38 by the near field data transmission means 34. The container operating data include at least time data and access data.

FIGS. 7 to 10 thus show a method for opening a container 1. Here, the method includes at least the following steps: providing a container 1, providing at least one mobile terminal 16, wherein the mobile terminal 16 includes: a near-field data transmission means 34 for data exchange with the near-field data transmission device 14 of the container 1; a far-field data transmission means 36, e.g., LTE, for data exchange with a server 38; a processor device 40 for executing a control application; and a storage device 42 for storing container reconfiguration data and container operating data. The container operating data are transmitted by the near-field data transmission device 14 to the near-field data transmission means 34 of the mobile terminal 16 to be forwarded to the server device 38 and the mobile terminal 16 receives the container reconfiguration data from the server 38 via the far field data transmission means 36, wherein the container reconfiguration data are generated in response to the container operating data transmitted to the server 38 by means of the near field data transmission means 34 and wherein the container operating data include at least time data and access data.

Figure 11:
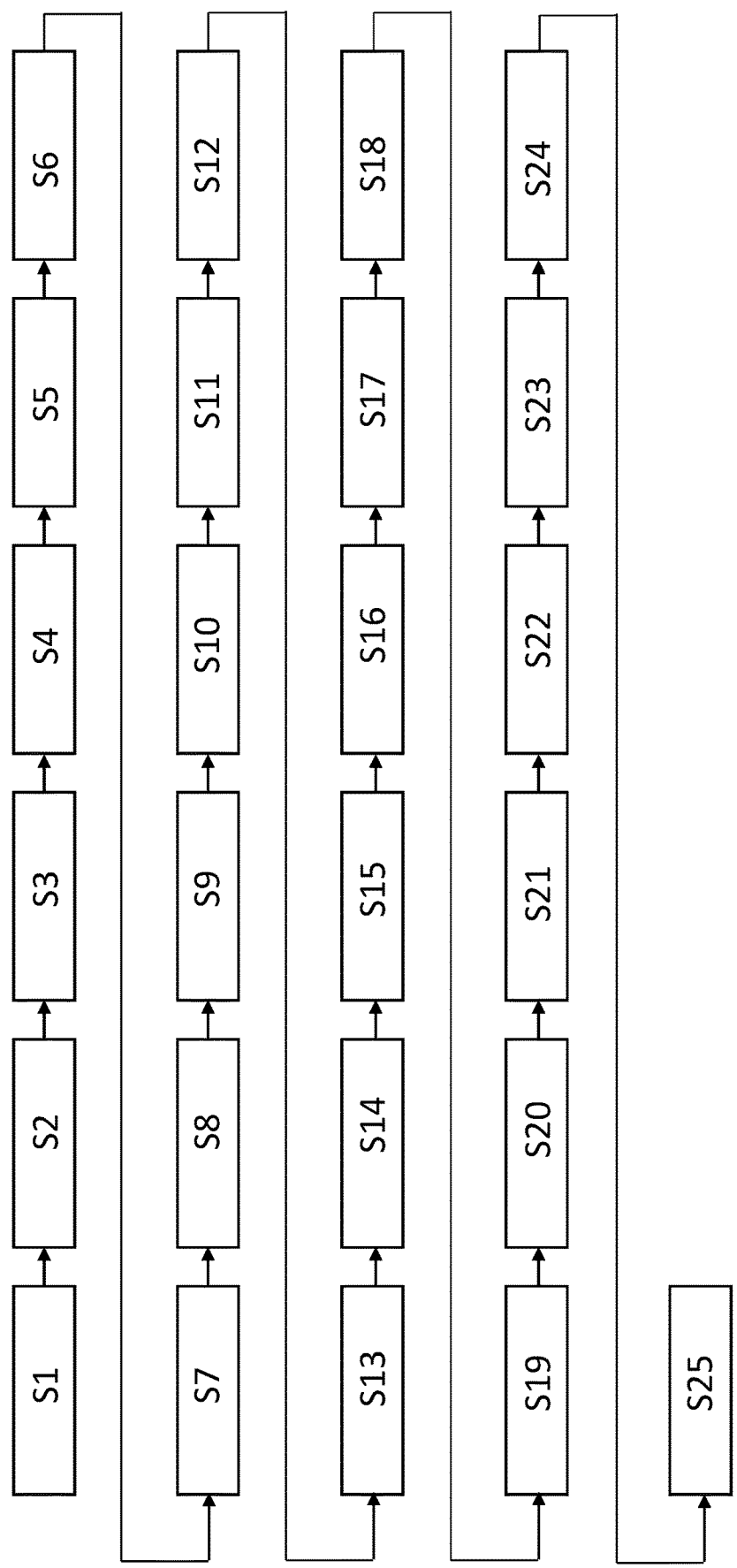
FIG. 11 shows, purely by way of example, a preferred method sequence according to the present teachings, wherein a single one of or multiple of the steps shown need not be carried out or can also be carried out in a different sequence or also several times.

FIG. 11 shows a schematic sequence of the representative method according to the present teachings, wherein this sequence includes a large number of additional or alternative steps. Here, the steps S1-S25 shown in FIG. 11 comprise:

S1. The operator/administrator creates a lock unit having a unique identifier on the central server unit and, if necessary, links it to a lock group.

S2. The operator/administrator creates a user on the central server unit or provides a defined user group with the option of registering themselves on the central server unit (self service).

S3. The user loads the necessary software from an app store or another storage location, which is accessible online, onto his/her mobile device (e. g., a smartphone). In principle, this can be done from anywhere in the world.

S4. The user logs on to the central server unit via his/her app. To do this, he/she uses known access data (as created by the operator/administrator in step 1) or, in the case of the self-service, he/she registers and chooses his/her access data accordingly.

S5. The central server unit checks whether access rights are available for the user or the group(s) in which the user is assigned to one or more locks or lock groups. If access rights are available, these are transmitted in encrypted form to the mobile unit (as appropriate with any additional information available). The access rights can also be subject to time restrictions. For example, an access right can automatically expire after 24 hours, as long as no further synchronization takes place between the mobile unit and the central server unit during this period.

With every synchronization between the mobile unit and the central server unit, in addition to the access rights and further information, the system clocks e.g., are compared so that deviations in the clocks can be taken into account.

S6. The access data and additional information received by the mobile unit are buffered locally in encrypted form in a "virtual key ring". Here, the mobile unit regularly checks whether an access right still exists and, if necessary, deletes all access rights that have already expired.

S7. If the user now wants to open a lock unit and his/her mobile unit is within range, then the mobile unit will either establish a connection to the lock unit automatically (in the background) or after manual entry in the mobile unit ("connect button"). The connection between the mobile unit and the lock unit can be further encrypted beyond the encryption included in the transmission standard.

S8. When the connection to the mobile unit is established, the lock unit transmits a unique identifier to the mobile unit. If necessary, additional information can also be transmitted (e.g. belonging to a specific lock group).

S9. The mobile unit checks whether access rights exist in the local memory for this lock or the lock group. In this context, a connection to the central server unit is not established.

S10. If access rights exist, it may be necessary (depending on the configuration by the operator/administrator) that additional keys are required to operate the lock unit (e.g., PIN input, scanning a barcode, etc.) that must be entered in the mobile unit and transmitted to the lock unit. In addition, it may be necessary to establish a connection to the central server unit, as the configuration specifies that the lock is to be opened only when there is a connection between the mobile unit and the central server unit in order to further increase security, since the access rights also are always synchronized between the mobile and central unit via an active connection.

S11. The mobile unit sends the lock unit (after a positive check) a signal to open and transmits the corresponding key.

S12. The lock unit checks the key and will store both the connection attempt and the result of the check, as well as all information transmitted about the user or the mobile unit in the internal temporary memory.

S13. After a positive check, the lock unit releases the locking mechanism and will also store this event in the temporary memory.

S14. The mobile unit now transmits data to the lock unit that has been linked to the access right in the central server unit. For example, the information that data provided by the lock unit can be received there and can now be deleted locally. However, changes to the local configuration of the lock unit software can also be transferred.

S15. The lock unit will delete from the local memory the data received from the central unit and will carry out all other necessary operations.

S16. The deletion and/or the execution of the operations is acknowledged.

S17. The lock unit now transfers all data from the temporary memory (log data on accesses, access attempts, as well as all stored sensor data to the mobile unit). All data that are already marked for deletion, but the receipt has not yet been confirmed by the central server unit, are also transmitted.

S18. The mobile unit receives the data from the lock unit and stores it in a protected area. The receipt is acknowledged.

S19. The lock unit will now mark all transmitted data with additional information (mark it for deletion), but not yet delete it, as it is not yet certain that this data has also been received on the server unit. If necessary, data that has been transmitted multiple times is enriched with additional information.

S20. The connection between the lock unit and the mobile unit is terminated again.

S21. The mobile unit will now try to contact the central server unit at the next possible time or at a configured time and to transfer the data transmitted by the lock unit to it.

S22. As soon as there is a connection between the mobile unit and the central server unit, the data is transmitted and acknowledged by the central server unit.

S23. The acknowledged data will now be deleted from the temporary memory of the mobile unit.

S24. The central server unit now updates the access right to the specific lock with the information that the defined data has been received and can be deleted locally (taking into account the information which data has already been deleted by the unit).

S25. The access right is now synchronized with all mobile units that have access to the specific lock or the associated lock group.

Thus, a method for asymmetrical or indirect transmission of data between a transmitter and a receiver is disclosed herein.

For example, sensor data which are collected in places where there is temporarily or permanently no internet connection or no connection to an alternatively suitable transmission network can be transmitted to a central server. Such "offline situations" exist in dead spots, under ground, under water, etc.

In terms of content, techniques according to the present teachings are preferably based on the method likewise described above for the secure assignment of unique access rights without the use of specialized hardware and without an existing Internet connection. A component here is a mobile application that runs on a device, e.g., a server and/or multiple mobile terminals, which is connected via a mobile data connection to a server device, e.g., a central server, and from which it can receive keys (analogous to the method described above) and can provide them locally.

If sensor data of an (offline) container is now to be transmitted to the server device 38, e.g., the central server, the mobile device or the mobile terminal 16 must be brought into the vicinity of the container 1 so that the near field transmission means 34 of the mobile terminal 16 can receive raw or processed or partially processed sensor data from one or more sensors arranged on or in the container 1. The sensor data are transmitted via the near-field data transmission device of the container, e.g., of the lock device 10, to the near-field data transmission means 34 of the mobile terminal 16. The sensor is provided or coupled or connected to an electronic device, e.g., the processor device 20, which stores the data made available by the sensor, e.g., in a configurable manner, locally, e.g., in a memory unit 18.

If the mobile device 16 comes within range of the near-field data transmission device 14, it preferably authenticates itself using the access key for the container 1, e.g., for the processor device 20, and requests the content or defined data of the data held or temporarily stored in the local memory, e.g., time and/or sensor data.

If the processor device 20 accepts the access and the request, the requested data is transmitted to the mobile device 16 (e.g., via Bluetooth® or NFC). After checking the completeness and correctness of the transmitted data, the mobile terminal 16 preferably sends a delete signal or delete data, which trigger the deletion of at least part of the locally stored or temporarily stored data, e.g., the sensor data and/or time data (temporary memory erased). Otherwise, the transfer is preferably requested again. The same mechanism can also be used to transfer configuration changes to the container and to synchronize the local times (container and mobile device). After the connection has been disconnected, the container 1 and the sensor or sensors arranged or provided therein preferably operate completely independently and collect data until the next access by the mobile application.

The container data, e.g., the data generated by the sensor(s), can thus be completely transmitted to a central unit, e.g., to the server device 38, even without a permanent Internet connection, by the upstream transmission to a mobile terminal 16. Thus, a method for asymmetrical and/or indirect transmission of data between a transmitter (mobile terminal) and a receiver (container) is provided, wherein after the data has been set up, the mobile terminal also receives data from the container and/or the container sends data to the mobile terminal.

LIST OF REFERENCE SYMBOLS

1 Container
2 Object
4 Main body
5 Receiving part
6 Accommodation volume
8 Opening device
10 Lock device
11 Opening/membrane
12 Actuator
14 Near field data transmission device
15 Antenna unit
16 Mobile terminal
17 Bolt
18 Memory unit
19 Electronic unit
20 Processor device
22 Energy source
23 Sensor device
24 Temperature sensor
25 Distance
26 Wall of the container
28 Humidity sensor
29 Air humidity sensor
30 Weight sensor
31 Further weight sensor
32 Base
34 Near field data transmission means
36 Far field communication means
37 Far-field communication infrastructure
38 Server or server device
40 Processor device of the mobile terminal
42 Storage device
44 Hole for fastening screw
46 Accelerometer
50 Coverage area of the near field communication means of the container
52 Coverage area of a far-field communication infrastructure 54 Communication between server and transmission infrastructure
56 Communication between the transmission infrastructure and the mobile device
58 Near field communication between near field communication means and near field communication device
240 Further temperature sensor

The invention claimed is:

1. A method for opening a container using at least one mobile terminal,
wherein the container includes:
  a main body that encloses an accommodating volume in a multi-sided manner,
  an opening device that is moveable relative to the main body, and
  a lock device configured to selectively prevent a defined movement of the opening device relative to the main body, the lock device including:
    a near-field data transmission device configured to receive data from and send data to the at least one mobile terminal while the at least one mobile terminal is temporarily located within a defined distance range from the container,
    a memory unit configured to temporarily store time data and access data, wherein the time data includes a last opening time point and/or a last closing time point, wherein the access data includes at least authorization data and identification data, wherein the authorization data define, in dependence on the identification data, a condition under which the lock device is converted from a closed configuration to an open configuration by the actuator, and wherein the identification data specify an assignment to the at least one mobile terminal,
    a processor device configured to compare the authorization data and the identification data,
    an electrically operated actuator that is controllable, in response to a defined match of the compared authorization data and the authorization data, to convert the lock device to the open configuration, and
    an energy source that supplies operating current to at least the actuator, the near-field data transmission device, the memory unit and the processor device and that is not a commercial AC supply,
  wherein the at least one mobile terminal includes:
    a near-field data transmission means configured to exchange data with the near-field data transmission device of the container,
    a far-field data transmission means configured to exchange data with a server,
    a processor device configured to execute a control application, and
    a memory device that stores container reconfiguration data and container operating data, wherein the container operating data include at least time data and access data,
  the method comprising:
    causing the processor device of the lock device to store a specific set of container operating data in modified form in the memory unit of the lock device at least after this set of container operating data has been sent to the at least one mobile terminal, wherein the specific set of container operating data is marked for deletion,
    transmitting the container operating data from the near-field data transmission means of the lock device to the near-field data transmission means of the at least one mobile terminal,
    transmitting the container operating data from the far-field data transmission means of the mobile terminal to the server,
    generating new container reconfiguration data in the server in response to the container operating data received from the at least one mobile terminal, and
    transmitting the new container reconfiguration data from the server and receiving, in the at least one mobile terminal, the new container reconfiguration data from the server via the near field data transmission means of the at least one mobile terminal,
  wherein:
  the new container configuration data specify to delete the marked container operating data from the memory unit of the lock device, and
  the processor device of the lock device deletes the marked container operating data from the memory unit of the lock device as a function of the new container reconfiguration data.

2. The method according to claim 1, further comprising:
sending data and/or sensor signals from at least one sensor in the container to the processor device of the container, and
transmitting, from the near-field data transmission device of the lock device, signals and/or data which represent or delineate the sensor data or sensor signals as part of the container operating data to the near-field data transmission means of the at least one mobile terminal.

3. The method according to claim 1, further comprising:
sending identification data from the server to the at least one mobile terminal together with the container reconfiguration data or as a separate data record,
storing the identification data from the server in the memory device of the at least one mobile terminal,
transmitting the identification data from the mobile terminal together with specific device data of the at least one mobile terminal to the near-field data transmission device of the lock device in response to an access authorization request,
comparing at least the identification data and the authorization data stored in the memory unit of the lock device,
maintaining the lock device in a locked state or converting the lock device to an open state as a function of a comparison result resulting from the comparison.

4. The method according to claim 1, wherein the container reconfiguration data include authorization data and an instruction to the processor device of the lock device to replace and/or augment the authorization data held in the memory unit of the lock device with authorization data of the container reconfiguration data.

5. A non-transitory computer storage medium comprising computer-readable instructions that, when executed, carry out the method according to claim 1.

* * * * *